April 30, 1940.  C. M. MIKKELSON  2,198,944
SAFETY BRAKE SEAL
Filed Aug. 3, 1938

Clarence M. Mikkelson
INVENTOR
BY Victor J. Evans & Co.
ATTORNEYS

Patented Apr. 30, 1940

2,198,944

UNITED STATES PATENT OFFICE 2,198,944

SAFETY BRAKE SEAL

Clarence M. Mikkelson, New Hampton, Iowa

Application August 3, 1938, Serial No. 222,927

1 Claim. (Cl. 188—2)

This invention relates to vehicle brakes, and its general object is to provide a seal therefor in the form of an annular band to be mounted on and fixed to the cover plate of the brake housing, for disposal in surrounding and bridging relation with respect to the joint between the plate and the drum, to effectively seal the joint against the entrance of water, dirt, dust and other foreign matter to the interior of the drum, thereby materially eliminating excess wear of the drum and the lining, as well as assures uniform and efficient braking action under all weather and road conditions.

A further object is to provide a brake sealing band that can be applied and removed in an easy and expeditious manner, is readily adjustable to compensate for wear or variances between the plate and drum, and the use thereof does not in any way interfere with the proper operation of the brakes, servicing and replacement of the parts thereof, or brake and bearing lubrication and adjustments.

Another object is to provide a sealing band that will fit practically all types of brakes, is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
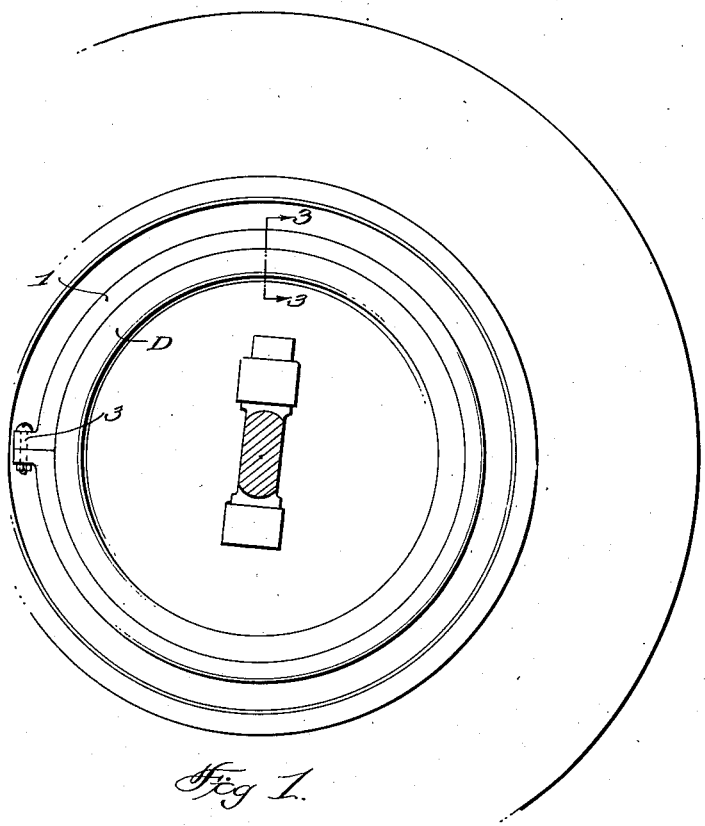
Figure 1 is a view looking toward the inner side of a vehicle wheel and brake therefor, with my sealing band in position for use.

Referring to the drawing in detail it will be noted that I have illustrated my sealing band as being applied to two well known forms of brakes, that is the brakes have different type drums, but it will be understood that my band can be used with brakes of other types for sealing the same as will be apparent.

Figure 2:
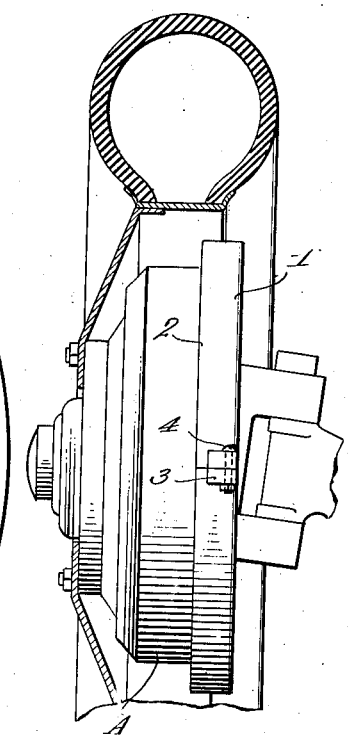
Figure 2 is a view partly in section and illustrates the brake and my sealing band in elevation.
Figure 3:
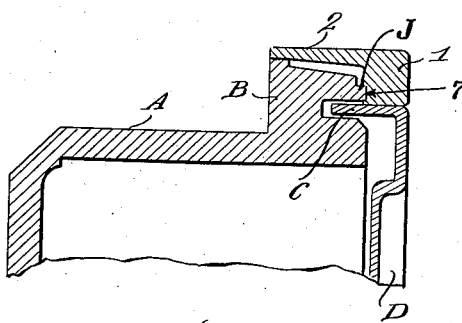
Figure 3 is a sectional view taken approximately on line 3—3 of Figure 1, looking in the direction of the arrows.
Figure 4:
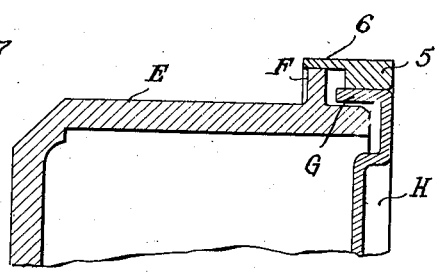
Figure 4 is a view similar to Figure 3, with my sealing band applied to a different form of brake than that shown in Figures 1 to 3.

The form of brake as shown in Figures 1 to 3 inclusive includes a drum A that is provided with a shoulder B having an annular groove therein to receive the flange C of the cover plate D, while the form or type shown in Figure 4 includes a drum E having a shoulder in the form of a rib F formed thereon and providing with the edge portion of the drum E, a recess to receive the flange G of the cover plate H, which is shown as being substantially the same construction as that of the plate D.

The sealing band is of course annular for the purpose intended and it is shown as being made into a single unit and from any material suitable for the purpose, such as metal, rubber, or a composition.

The form of band as shown in Figures 1 to 3, is provided with a relatively thick body portion 1 of substantially rectangular formation in cross section, and has a smooth inner circumferential face engaged with the flange C of the cover plate to which the band is attached in surrounding fitting relation thereto. Formed on and extending laterally from the outer circumferential edge of one side face of the body is a relatively thin strip like extension or flange portion 2 slightly tapered inwardly from its juncture with the body and being of suitable width to cooperate with the body 1, to bridge the joint between the flange C of the cover plate and the shoulder B so that the latter is in wiping engagement with the extension 2, as well as with the body 1 and the body may be provided with a shallow annular groove 7 for fittingly receiving the reduced portion J of the shoulder B, as clearly shown in Figure 3. By that construction, it will be seen that the band will effectively seal the joint against the entrance of elements that are detrimental to the drum and lining, such as water, dirt, mud, dust and other foreign matter, as set forth in the objects of the invention.

The sealing band in the form as shown is split transversely to facilitate its application and removal with respect to the brake housing, without removing any of the vehicle parts, and the band is detachably secured to the flange C by suitable securing means which is shown as being apertured ears 3 formed on and extending outwardly from the band at the split ends thereof for cooperation with each other to receive a bolt and nut connection 4 for drawing the band in tight association with respect to the housing.

The bolt of the bolt and nut connection is preferably provided with a kerfed or slotted head and by that construction, it will be obvious that the band can be applied and removed merely by the use of a screw driver or the like and a jack, if the latter is found to be necessary for lifting the wheel.

The form of Figure 4 is substantially similar to the form of Figures 1 to 3, in that it includes a relatively thick body 5 of rectangular formation in cross section, but the strip like extension or flange portion 6 is not tapered and is of an equal thickness throughout its entire area. This form is detachably secured to the flange G of the cover plate H, with its flange portion 6 bridging the space between the flange G and the rib F, so that the later is in wiping engagement with the flange portion 6, as clearly shown in Figure 4.

It is thought from the foregoing description that the advantages and novel features of the invention will be readily apparent.

It is be understood that changes may be made in the construction and in the combination and arrangement of the several parts, provided that such changes fall within the scope of the appended claim.

What I claim is:

A seal for a brake housing including a shouldered drum and a flanged cover plate, and said seal comprising an annular band split transversely and including a relatively thick annular body portion of substantially rectangular formation in cross section for disposal in surrounding and fitting engagement with the flange of the cover plate, a relatively thin wide annular strip like extension formed on and about the outer circumferential edge of one side face of the body portion and extending therefrom at substantially right angles thereto throughout the entire width of the extension to bridge the joint between the plate and the brake drum with the shoulder of the latter disposed in wiping engagement with the extension so that said extension cooperates with the body portion for sealing the joint, apertured ears formed on the ends of the band, a bolt and nut connection with the bolt extending through the apertures of the ears to cooperate with the nut for drawing and securing the body about the flange, and the head of the bolt being kerfed.

CLARENCE M. MIKKELSON.